United States Patent [19]

Comparato et al.

[11] 4,300,458
[45] Nov. 17, 1981

[54] APPARATUS FOR SUPPORTING A PERFORATED PLATE AIR DISTRIBUTOR FOR A FLUIDIZED BED

[75] Inventors: Joseph R. Comparato; Ernest L. Hartman, both of Bloomfield; Edward A. Zielinski, Harwinton; David T. Myrick, Bloomfield, all of Conn.

[73] Assignee: Combustion Engineering, Inc., Windsor, Conn.

[21] Appl. No.: 126,750

[22] Filed: Mar. 3, 1980

[51] Int. Cl.³ .............................................. F23D 1/00
[52] U.S. Cl. .................................. 110/263; 110/245; 122/4 D; 126/152 R
[58] Field of Search .................. 431/7, 170; 122/4 D; 110/263, 245; 126/152; 432/58

[56] References Cited

U.S. PATENT DOCUMENTS

| 1,532,526 | 4/1925 | Zach | 126/152 R |
| 1,666,790 | 4/1928 | Privott et al. | 126/152 R |
| 2,715,565 | 8/1955 | McKay | 432/58 X |
| 4,090,852 | 5/1978 | Dowd | 110/263 X |

FOREIGN PATENT DOCUMENTS 2032590  5/1980  United Kingdom ................ 431/170

Primary Examiner—Edward G. Favors
Attorney, Agent, or Firm—Robert L. Olson

[57] ABSTRACT

Apparatus for supporting a perforated plate (24) air distributor for a fluidized bed combustion boiler. The plate (24) is supported (26) around its entire periphery, and at given points (42) within its periphery, in such a manner that it is free to expand due to thermal growth in a horizontal direction, while still being capable of supporting a vertical load (12) without sagging, buckling, or being subject to failure.

1 Claim, 4 Drawing Figures

APPARATUS FOR SUPPORTING A PERFORATED PLATE AIR DISTRIBUTOR FOR A FLUIDIZED BED

BACKGROUND OF THE INVENTION

Due to increasing concern about the effect of certain pollutants that result from coal burning, alternate methods for burning coal are being tried. One such alternate method that is employed to reduce the production of oxides of sulfur uses a fluidized bed, in which the force of the flowing combustion air is used to keep the coal particles in a quasi-fluid state. Limestone particles are included in the bed, and the heat of combustion causes the limestone to give off some carbon dioxide, forming quick lime. Quick lime reacts with sulfur trioxide or oxygen and sulfur dioxide to produce a calcium sulphate coating on the limestone. The sulfur content of the stack emission is thereby reduced.

The bed is operated at about 1550° F. to optimize the sulfur capture reaction, and thus the perforated plate through which the fluidizing and combustion air flows is at approximately 1300° F. during normal operation. The air enters at approximately 600° F. When the unit is started up and shut down, this perforated plate is subject to wide thermal swings, and thus it must be capable of freely expanding and contracting. Also, it must be capable of supporting the coal and limestone bed. This load can be as heavy as 400 lbs. per square foot when the unit is operating at full load.

SUMMARY OF THE INVENTION

In accordance with the invention, the perforated plate of a fluidized bed is made up of a plurality of side-by-side small plates, so that the thermal growth of each plate is considerably less than would be the case if one large plate were used. Each plate is supported around its entire periphery, and also at given points within its periphery, in such a manner that the plate is free to thermally expand in a horizontal direction without sagging or buckling under load.

DESCRIPTION OF THE PREFERRED EMBODIMENT

Figure 1:
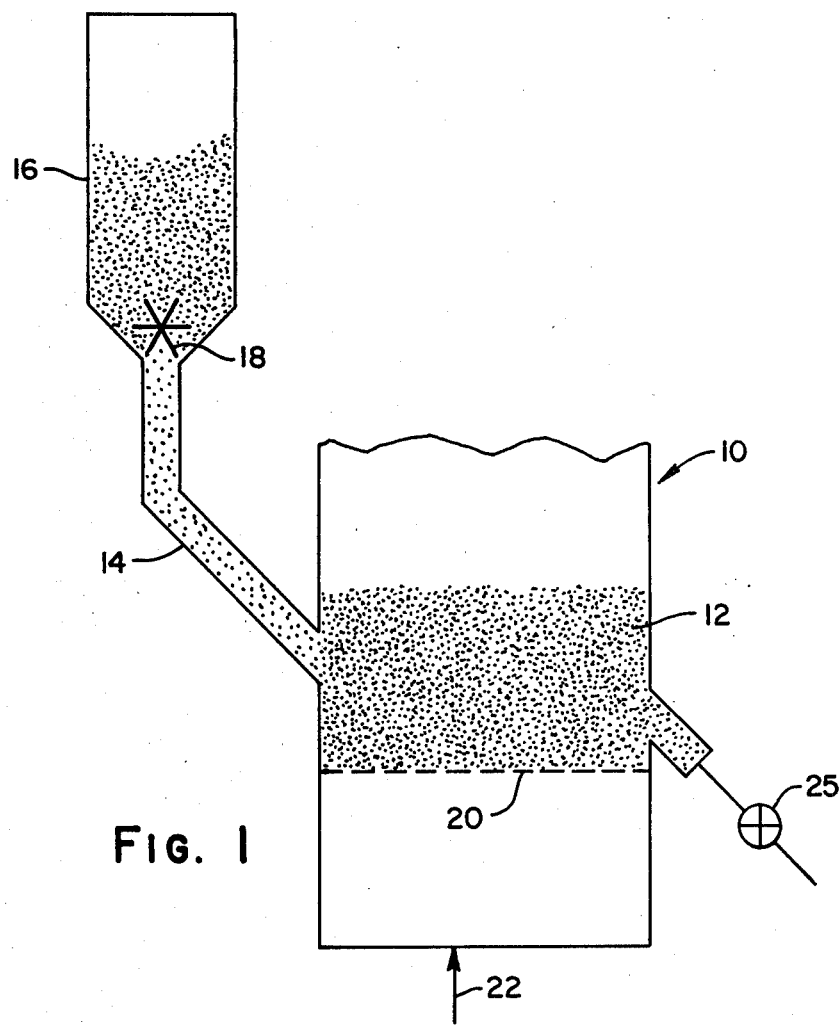
FIG. 1 is a partial side elevation of a fluidized bed boiler for the conbustion of coal.
Figure 2:
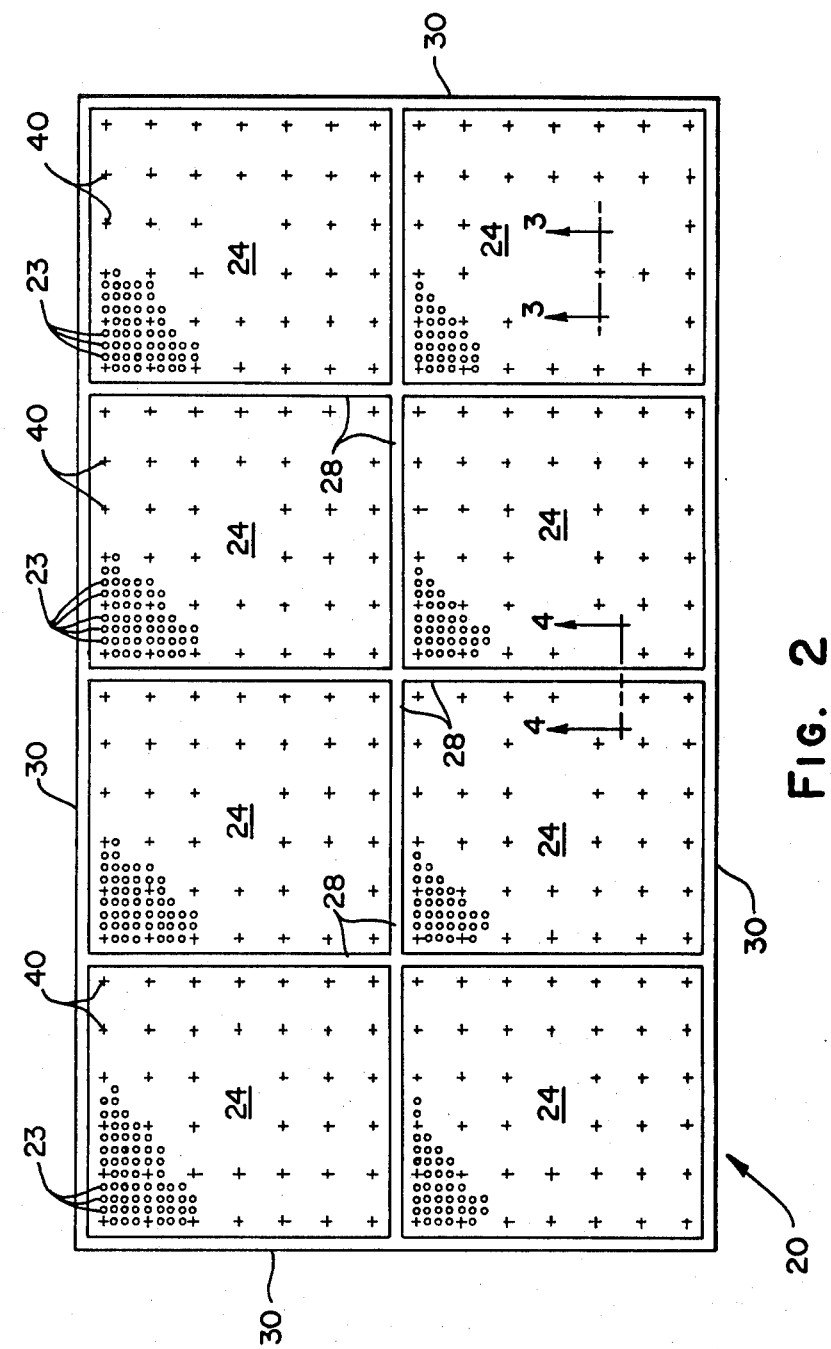
FIG. 2 is an enlarged plan view of the perforated air plate taken on line 2—2 of FIG. 1, with the coal removed.

Looking now to FIG. 1, numeral 10 denotes a coal fired fluidized bed furnace having a bed 12 in which fluidized coal is burned. Coal and limestone are continually introduced to the furnace through duct 14 from hopper 16. A rotary air lock 18 or similar equipment meters coal and limestone into the furnace as required. Air to support combustion of the coal, and to fluidize the bed of solid material is introduced from beneath the air distributor 20 through duct 22 and holes 23 in the grate (FIG. 2). Ash and limestone are discharged from the fluidized bed 12 by 25, a metered drain line which regulates bed depth.

Figures 3, 4:
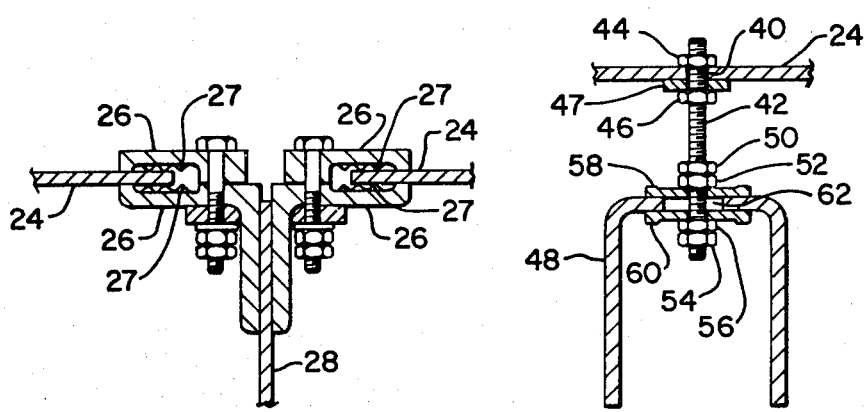
FIG. 3 is an enlarged sectional side view taken on line 3—3 of FIG. 2.
FIG. 4 is an enlarged sectional side view taken on line 4—4 of FIG. 2.

Turning now to FIGS. 2–4, the construction of and manner in which the grate 20 is supported is shown in more detail. The air distributor 20 is made up of a plurality of relatively square perforated plates 24 (FIG. 2). Each plate is supported around its entire periphery by being clamped between a pair of jaws of clamps 26 (FIG. 4), which jaws are held together by nuts and bolts. These jaws or clamps 26 are left sufficiently loose so as to permit the plates 24 to slide therebetween when they expand and contract with thermal swings when the unit is started up and shut down. FIG. 4 shows the support at the juncture between two of the plates 24. Around the outside edges of the grate 20, only one set of jaws is required to support the one plate. The jaws 26 enclose a gasket strip 27. The clamping of the jaws 26 compresses the gasket strip 27. Compression of the gasket strip 27 to the air distributor plate 20 prevents leakage around the air distributor plate 20 from the duct 22 to the fluid bed furnace 12. The jaws 26 illustrated in FIG. 4 are supported by a beam 28 which extends entirely across the grate 20, and is supported by the outer wall 30 of the furnace 10.

Looking now to FIG. 3, the manner in which the plates 24 are supported at points within their periphery is shown in more detail. As shown, holes 40 are formed at uniformly spaced points across the plates 24. A bolt 42 threaded at both ends has its upper end extending up through the hole 40. The bolt 42 is tightly locked onto the plate 24 by means of a pair of nuts 44 and 46, with a washer 47 positioned beneath the plate. A welded joint may also be used. The lower end of the bolt is loosely secured to a structural channel bar 48, in such a manner as to permit the bolt to move horizontally with respect thereto. Two pairs of lock nuts, 50, 52 and 54, 56 accomplish this. A pair of oversized washers 58 and 60 are also used. In this manner, as the plate 24 moves horizontally with thermal expansions and contractions, the bolt 42 is free to move within the oversized hole 62 in the channel bar 48, while the vertical load on the plate 24 is still picked up and supported by the channel bar 48. This prevents the plate 24 from sagging or buckling under the load of coal and limestone, which load can reach the order of 400 lbs. per square foot at full load operation. The channel bars 48 are secured at their ends to the walls of the fluidized bed housing.

From the above, it can be seen that a fluidized bed perforated plate is provided which can support the material thereon while still being capable of thermally expanding and contracting as the unit is started up and shut down. By using a plurality of small plates to make up the entire bed, the amount of growth or movement is minimized. In other words, each plate grows much less than one large plate would. Each plate is supported around its entire periphery and at given spaced points within its periphery so as to be free to move horizontally.

A preferred plate 24 is ⅜" thick and will be at approximately 1300° F. during operation. The plate is approximately 4½ feet square. The air flowing through the hole in the plate is approximately 600° F., with the air holes being about 1" apart and the plate being supported by the channel member at points approximately 7" apart. Each plate will grow about ⅜" in each direction so that each bolt 42 must be capable of moving half that distance, or ⅜". The present structure permits this growth.

We claim:

1. A fluidized bed system, including a furnace having side walls and containing grate means, said grate means being made up of a plurality of grate plates, means for introducing carbonaceous fuel particles onto the grate means, duct means for introducing high velocity air beneath the grate means for fluidizing and supporting combustion of the carbonaceous fuel, support means for the grate means, said support means including fixed support bars which extend beneath each grate plate across the width of the furnace and are attached to and supported by the side walls of the furnace, and means connecting each grate plate to the support bars in such a manner that the grate plates are free to expand and contract relative to the fixed support bars, and wherein each grate plate is further supported around its entire periphery by clamp members which permit each grate plate to move horizontally with respect to the clamp members supporting its periphery.

* * * * *